(12) United States Patent
Maisonnier et al.

(10) Patent No.: US 8,965,573 B2
(45) Date of Patent: Feb. 24, 2015

(54) METHOD FOR CONTROLLING THE WALKING MOTION OF A MOBILE ROBOT, AND ROBOT IMPLEMENTING SAID METHOD

(75) Inventors: Bruno Maisonnier, Paris (FR); Pascal Lafourcade, Paris (FR); Alain Berthoz, Paris (FR)

(73) Assignee: Aldebaran Robotics, Paris (FR)

( * ) Notice: Subject to any disclaimer, the term of this patent is extended or adjusted under 35 U.S.C. 154(b) by 0 days.

(21) Appl. No.: 13/381,386

(22) PCT Filed: Jun. 29, 2010

(86) PCT No.: PCT/EP2010/059211
§ 371 (c)(1),
(2), (4) Date: Apr. 18, 2012

(87) PCT Pub. No.: WO2011/000832
PCT Pub. Date: Jan. 6, 2011

(65) Prior Publication Data
US 2012/0197435 A1   Aug. 2, 2012

(30) Foreign Application Priority Data
Jun. 30, 2009  (FR) .................................. 09 54452

(51) Int. Cl.
*B62D 57/032* (2006.01)

(52) U.S. Cl.
CPC ............ *B62D 57/032* (2013.01); *Y10S 901/01* (2013.01)
USPC ............... 700/253; 700/245; 700/250; 901/1; 318/568.12

(58) Field of Classification Search
USPC ...................... 700/245, 250, 253; 901/1, 50; 318/568.12
See application file for complete search history.

(56) References Cited

U.S. PATENT DOCUMENTS

| | | | |
|---|---|---|---|
| 5,357,433 A | | 10/1994 | Takenaka et al. |
| 5,808,433 A | * | 9/1998 | Tagami et al. ............ 318/568.12 |
| 7,348,747 B1 | * | 3/2008 | Theobold et al. ........ 318/568.21 |
| 2006/0184276 A1 | * | 8/2006 | Takenaka et al. ............. 700/245 |
| 2009/0009124 A1 | * | 1/2009 | Suga et al. ................ 318/568.12 |
| 2009/0306821 A1 | * | 12/2009 | Park et al. ..................... 700/245 |

OTHER PUBLICATIONS

Kuo, Arthur D., A Simple Model of Bipedal Walking Predicts the Preferred Speed-Step Length Relationship, Jun. 2001, Journal of Biomechanical Engineering, vol. 123, pp. 264-269.*

(Continued)

*Primary Examiner* — Spencer Patton
(74) *Attorney, Agent, or Firm* — Baker and Hostetler LLP (57) ABSTRACT

A computer program and a system for controlling walking of a mobile robot, notably a humanoid robot moving on two legs. Conventionally, control was guided by driving a zero moment point. Such driving was performed within a fixed coordinate system connected to a progression surface and assumed knowledge of the characteristics of said surface and the creation of a provisional trajectory. Such driving encountered significant limitations due to the nature of the progression surfaces on which walking can effectively be controlled and an obligation to have a perfect knowledge of their geometry; and also in respect to the necessary computing power, and the appearance of the walk which bore little resemblance to an actual human walk. The invention overcomes such limitations by providing a walk which includes a pseudo-free or ballistic phase, an impulse phase imparted by the heel of the robot, and a landing phase.

14 Claims, 8 Drawing Sheets

(56) References Cited

OTHER PUBLICATIONS

Thompson, Dave, "Hip biomechanics and the control of posture," Jul. 9, 2000, http://moon.ouhsc.edu/dthompso/namics/hipbmk.htm.*

Kuo A D et al.: "Energetic Consequences of Walking Like an Inverted Pendulum: Step-to-Step Transitions," Internet Citation, Apr. 21, 2005.

Collins S et al.: "Efficient bipedal robots based on passive-dynamic walkers," Science American Assoc. Adv. Sci USA LNKD-DOI: 10.1126/Science. 1107799, vol. 307, No. 5712, Feb. 18, 2005, pp. 1082-1085.

Victor Nunez: "Etude de la commande des movements dynamiques d'un robot humanoide," Internet Citation, Jan. 10, 2009.

Sugihara T Ed—Kyung Jin Kim et al.: "Simulated regulator to synthesize ZMP manipulation and foot location for autonomous control of biped robots," 2008 IEEE International Conference on Robotics and Automation. The Half-Day Workshop on: Towards Autonomous Agriculture of Tomorrow, IEEE-Piscataway, NJ, USA, Piscataway, NJ, USA, May 19, 2008, pp. 1264-1269.

* cited by examiner

METHOD FOR CONTROLLING THE WALKING MOTION OF A MOBILE ROBOT, AND ROBOT IMPLEMENTING SAID METHOD

CROSS-REFERENCE TO RELATED APPLICATIONS

This application is a National Stage of International patent application PCT/EP2010/059211, filed on Jun. 29, 2010, which claims priority to foreign French patent application No. FR 09 54452, filed on Jun. 30, 2009, the disclosures of each of which are incorporated by reference in their entireties.

FIELD OF THE DISCLOSED SUBJECT MATTER

The present invention belongs to the field of robot programming systems. More specifically, it applies to the control of the walking and the travel of robots, notably of human or animal form, which are moving on limbs that may or may not be articulated. A robot can be qualified as humanoid from the moment when it has certain attributes of the appearance and the functionalities of a human being: a head, a trunk, two arms, possibly two hands, two legs, two feet, etc. Since the 17th century, walking has been modeled as being the progression of compass legs separated by a fixed pitch which are moving in a given direction (Borelli G., 1685, *De motiu animalium*, Vol. 1, Leiden, The Netherlands, Lugduni). Another image that is often used is that of the inverse double pendulum in which the two feet constitute the points in movement around which the top points of attachment of the two articulated legs to said hips oscillate by describing arcs in the general direction of walking.

BACKGROUND

More recently, theoretical works have sought to merge the principles of the modeling of the walk reviewed above with those of the modeling of the travel in which the behavior of each leg is likened to that of a spring with a given coefficient of extension and of length at rest.

These concepts have not however been applied with success to control the movement of robots over a long period. One of the reasons for this incapacity is probably that the principle of the inverse pendulum has hitherto been usefully applied only to the objects to which an external source imparted sufficient kinetic energy to ensure the forward progression beyond a few steps. The motorization of the hips is not in fact sufficient, except in cases such as that of a robot skating on ice, to communicate to a robot sufficient energy to compensate for the losses connected to the friction of the feet on the ground.

Most of the designers of robots articulated on limbs, notably the Japanese manufacturers such as Honda and Sony, have, for the driving of the walk, made use of various embodiments of a central concept called "Zero Moment Point", or ZMP. According to this concept, a determination is first of all made of the trajectory that the ZMP needs to have in a coordinate system connected to the ground to satisfy the dynamic balance conditions all along a trajectory planned according to walking direction and speed objectives. Then, the positions of the terminations and articulations of the robot are computed in the same coordinate system connected to the ground at each instant by inverse transformation of the equations determining the respective positions of the ZMP and of said terminations and articulations. This approach notably presents the following drawbacks: i) it presupposes a knowledge of the topography of the ground to be able to position, at any moment, the ZMP and the useful points of the robot in a coordinate system connected to the ground; ii) it entails a complete trajectory planning computation, which is extremely demanding in terms of computation power. Various improvements of the basic concept have been proposed over the years to limit the drawbacks of this approach. However, to date, no improvement has been able to totally eliminate them.

SUMMARY

It is precisely one of the objectives of the present invention to solve this problem by eliminating the reference to the ZMP, and by combining a model of the walk driven by the ballistic displacements of the hips with a supply of kinetic energy to the robot by the activation of the heel, in an approach that is more effective because it better models actual walking.

To this end, the present invention discloses a method for controlling the walking of a robot capable of moving on at least two limbs on a progression surface, said method comprising, for each step, at least one first step of movement of each of the hips over a substantially spherical trajectory centered on the end bearing on the ground of the limb attached to said hip and a second step of movement of said end to a new bearing point, said method being characterized in that it also comprises a step for computing a position of the new bearing point of said end on the progression surface based on the speed of the center of mass of the robot.

Advantageously, the method of the invention also comprises another intermediate step between said first and second steps during which the elongation between the end of the limb bearing on the ground and said hip is augmented by a value such that the segment joining the position of said hip at the end of a spherical trajectory to the position of the second hip at the start of the next spherical trajectory is substantially parallel to the progression surface.

Advantageously, the axis of the thorax of the robot is servo-controlled to remain within an angle that is substantially constant with the vertical.

Advantageously, the axis of the hips is servo-controlled according to the direction of walking.

Advantageously, the augmentation of the elongation between the end of the limb bearing on the ground and said hip is obtained by an impulse of said end on the ground triggered by pitch-wise control of an ankle articulation provided in said limb.

Advantageously, the augmentation of the elongation between the end of the limb bearing on the ground and said hip is obtained by an impulse of said end on the ground triggered by control of the articulation of the knee.

Advantageously, the augmentation of the elongation between the end of the member bearing on the ground and said hip is obtained by an impulse of said end on the ground triggered by a control of a cylinder in the leg, parallel thereto.

Advantageously, the impulses of the heel are triggered when the direction of the leg has an angle relative to the vertical greater than a limiting angle dependent on the speed of the COM and a walking speed setpoint.

Advantageously, the motorized articulation allowing for the impulse is controlled by a speed ramp as a function of the limiting acceleration of the motor and of the ratio of the speed of the center of mass to the walking speed setpoint.

Advantageously, the travel of the foot in the direction of walking depends on variables chosen from the group comprising the position of the center of mass in the same direction, the length of the limb, the length of the foot and the speed of the center of mass in the walking direction.

Advantageously, the travel of the foot perpendicular to the direction of walking depends on variables chosen from the group comprising the position of the center of mass in the same direction, the walking direction setpoint, the hip width, the speed in the direction perpendicular to the walking direction and the walking speed setpoint.

Advantageously, at least one limb may be controlled to produce a deceleration movement before its end touches the progression surface.

The invention also discloses a robot capable of moving on a progression surface on at least two limbs, said robot comprising at least one module that can generate, for each step, a movement of each of the hips over a substantially spherical trajectory centered on the end bearing on the ground of the limb attached to said hip and a module that can generate a movement of said end toward a new bearing point, said robot being characterized in that it also comprises a module for computing a position of the new bearing point of said end on the progression surface based on the speed of the center of mass of the robot.

Advantageously, at least one of the limbs includes a cylinder whose axis is parallel to the axis of said limb.

Advantageously, at least one end of one of said limbs includes a foot comprising at least two pivot-wise articulations with axes that are substantially mutually parallel, and substantially perpendicular to the direction of the foot, one close to the front end of the foot and the other close to the heel.

Advantageously, at least one end of one of said limbs includes a foot whose front end includes a rounding, the form of which is designed to trigger a lifting of the heel when the front end of the foot pivots forward.

Advantageously, a robot according to the invention also comprises a set of inertial sensors making it possible to keep the orientation of a coordinate system connected to a part of the robot substantially constant relative to a fixed external coordinate system.

Advantageously, a robot according to the invention also comprises a set of inertial sensors making it possible to accurately measure the accelerations and the speeds, linear and angular, of the thorax or of the head, making it possible to deduce therefrom the vector speed of the center of gravity.

To implement the invention, it is not necessary to know the geometry of the ground which is not directly involved in the stabilization. This does not pose any particular problem in the case of flat or regular progression surfaces (such as staircases). It becomes very difficult, even impossible, in the case of uneven surfaces. According to the invention, it is possible, as will be seen later, to determine the position of the robot in a fixed Galilean coordinate system without knowing the geometry of the ground and to control the walking movements within a coordinate system of the robot stabilized relative to the external coordinate system.

Furthermore, a robot produced according to one of the embodiments of the invention will have a possible speed of movement greater than the speed of a robot of the prior art whose walking is controlled by ZMP. In practice, in the case of a prior art robot, the robot must adjust its speed of movement to the computation capacity of the onboard processors, which are in wide demand through the need to continuously perform predictive movement trajectory computations which are complex because they rely on a modeling of the trend of the acceleration forces (preview controllers). This is no longer the case for robots produced according to the invention which can thus, with equal computation power, move more rapidly. A speed of 5 Km/h can thus be desirably achieved for a robot 1.3 m high with legs approximately 70 cm long.

Furthermore, the walking can be controlled without having to position the future position of the foot which moves accurately, whereas in the computation of the ZMP, the precise knowledge of the positions of the feet and of the reaction forces of the ground at these positions is essential.

The invention also provides the advantage of very closely replicating the true human walk. This allows for both a more realistic rendering of the movements of the robot and a programming of robot behaviors very close to those of a human being. Thus, it is quite possible to envisage, according to one embodiment of the invention, programming a robot for it to be able to perform jumps, possibly with forward or backward somersaults.

BRIEF DESCRIPTION OF THE DRAWINGS

The invention will be better understood, and its various features and advantages will emerge, from the following description of a number of exemplary embodiments and its appended figures in which.

DETAILED DESCRIPTION

Figure 1:
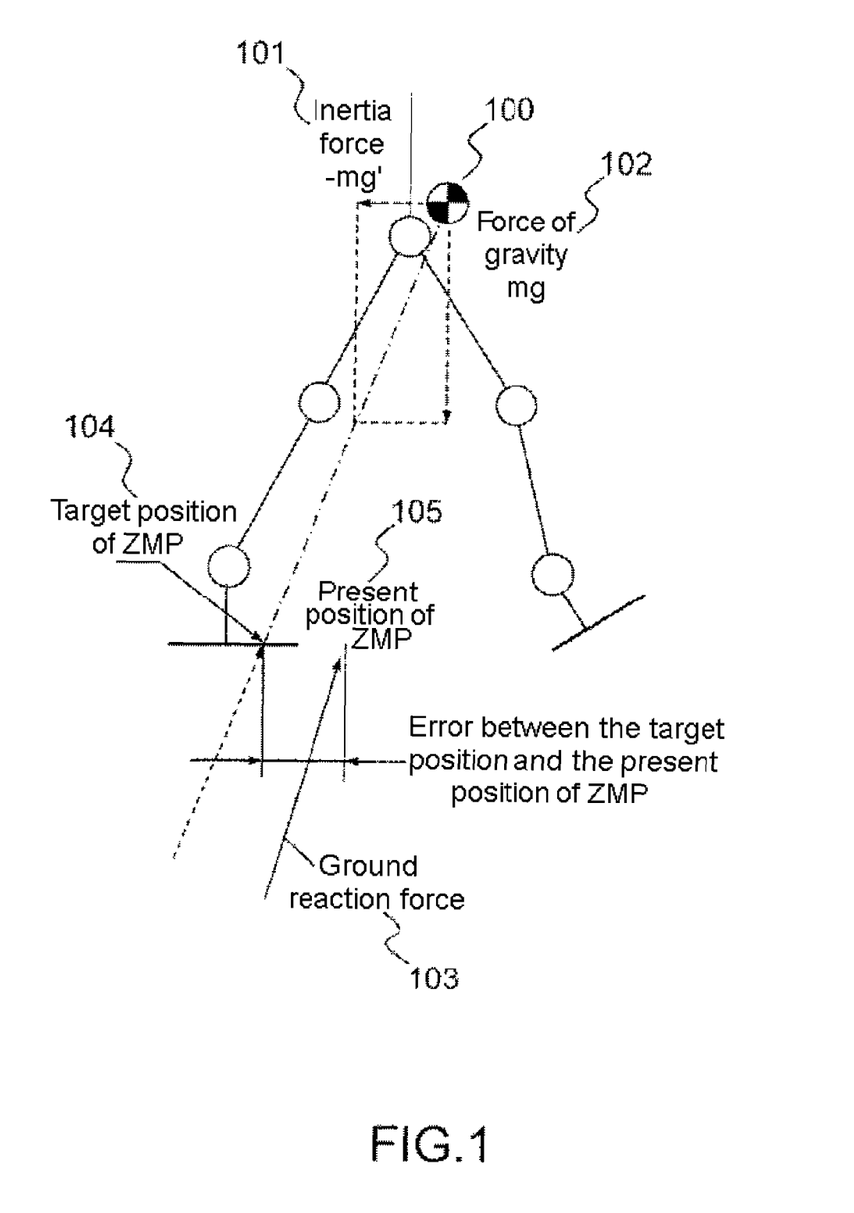
FIG. 1 is an illustration of the principles of an algorithm for controlling the walking of a robot according to a prior art document.

FIG. 1 is an illustration of the principles of an algorithm for controlling the walking of a robot according to a prior art document.

This is a humanoid robot.

This figure is taken from U.S. Pat. No. 5,357,433 granted on Oct. 18, 1994 to Takenaka et al (Honda). The patent relates to the implementation of a ZMP algorithm. According to the fundamental principles of dynamics, the sum of the moment of the inertia force 101 and of the moment of the force of gravity 102, compounded at the center of mass 100, must be balanced by the moment of the reaction force applied to the sole of the foot in contact with the ground. These conditions determine a series of target positions 104 of the ZMP, which are situated at the intersection on the ground of the inertial axis connecting the center of mass and the point of application of the reaction force. The real movement of the robot determines a real ZMP. The movements of the robot are controlled to bring the trajectory of the real ZMPs to the trajectory of the target ZMPs. For this, the orientation of the reaction forces of the ground and therefore the surface thereof, have to be known. The invention allows dispensing with this knowledge by exploiting another condition of stability of the robot.

Figure 2:
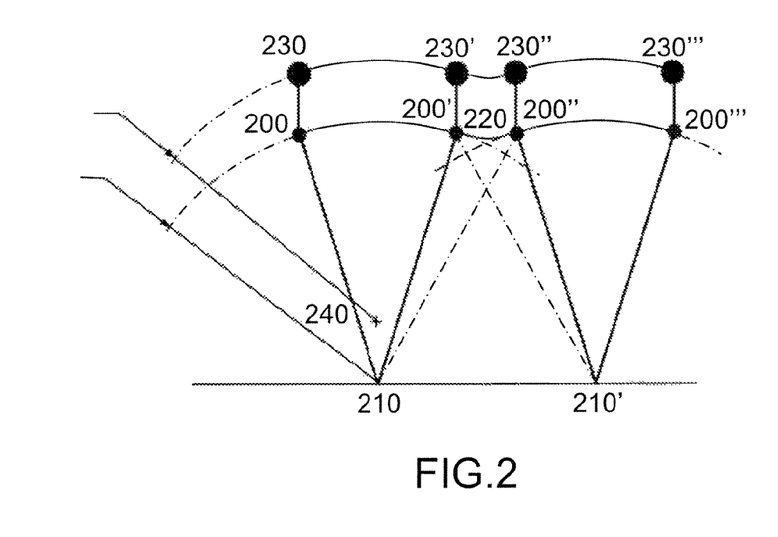
FIG. 2 is a schematic view in two dimensions of the walking model implemented in one embodiment of the invention according to a view perpendicular to the axis of movement and including the various significant articulations and to the center of mass.

FIG. 2 is a schematic view in two dimensions of the walking model implemented in one embodiment of the invention according to a view perpendicular to the axis of movement and including the various major articulations and the center of mass.

In the figure, the movement of one of the hips, covering 4 positions 200, 200', 200" and 200'", can be followed, whereas the foot of this leg moves from a first position on the ground 210 to a second position on the ground 210'. While the foot is on its first bearing point 210, the hip describes a first arc 200, 200' which is inscribed on a sphere centered at 210. In parallel, the second foot (not represented in the figure) moves from its old bearing point to its new bearing point, the point 210'. When the latter is reached, the corresponding hip describes a second arc 200", 200'". Concomitantly, the center of mass (COM) where, in the simplified model taken into account, all the mass of the robot is concentrated, follows a trajectory 230, 230', 230", 230'". This trajectory is also a succession of arcs of spheres of which one of the centers (the one corresponding to the positions 200, 210, 230) is referenced 240 in the figure. These two movements are ballistic, which means that they could continue without the contribution of outside energy if the transition between the points 200' and 200" was not the occasion of a loss of energy connected to the need to "climb up" onto the second sphere. According to the invention, the energy is imparted to the system to allow for this climb. This contribution of energy makes it possible to avoid having the hip descend on each step below a certain level relative to the progression surface. Thus, the movement is sustained. There are a number of ways of producing this contribution of energy. The common point between them is that, during this contribution, the distance between the hip and the bearing point on the ground of the corresponding limb is elongated, as can be seen in the figure: the length 210, 200" is greater than the length 210, 200'. To produce this elongation, it is possible, for example, to provide a cylinder in each limb which is actuated at the required moment to trigger the impulse. It is also possible to produce the elongation by keeping the knee of the robot bent during the ballistic phase and by unfolding it to provoke the impulse. In a way that more closely approximates the human walk, it is also possible to provide different heel lift modes which provide an elongation between the bearing point of the limb on the ground (of the toes, a rounded front end of the foot) and the hip. These different ways of producing the elongation providing a contribution of energy to the walk, which occurs in the area 220 of FIG. 2, will be explained later in the description, notably in the comments concerning FIGS. 6 and 7. Advantageously, the descent over the arc of sphere may have been previously slowed down, which corresponds to the reality of the human walking movement.

Figure 3:
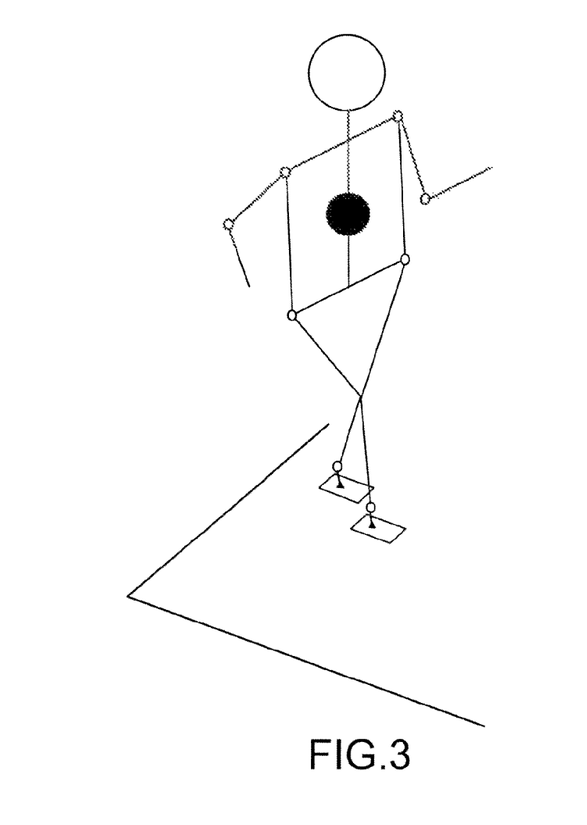
FIG. 3 is a schematic view of a robot showing the main characteristic points used to control its walking in one embodiment of the invention.

FIG. 3 is a schematic view of a robot showing the main characteristic points used to control its walking in one embodiment of the invention.

This front three-quarter view illustrates the relative positioning of the main elements, which make it possible to control the walking. Each of the hips, positioned at the end of an axis describing the pelvis, describes, during the walk, a trajectory which is a succession of arcs of sphere. These are connected by phases during which an impulse is imparted to one of the legs via an impulse given by the pivot articulation of the ankle whose axis is parallel to the frontal plane, leading to a rotation of the part of the foot bearing this articulation, around a pivot articulation situated at the front of the foot. Visually, this movement corresponds to the lifting of the heel of the bearing foot. The COM follows a trajectory which is determined both by the travels of the two hips over the arcs of spheres and by the rotational movements of the pelvis around the thorax which makes it possible to drive the direction of the walking, as explained later in the description, notably as commentary to FIG. 10.

Figure 4:
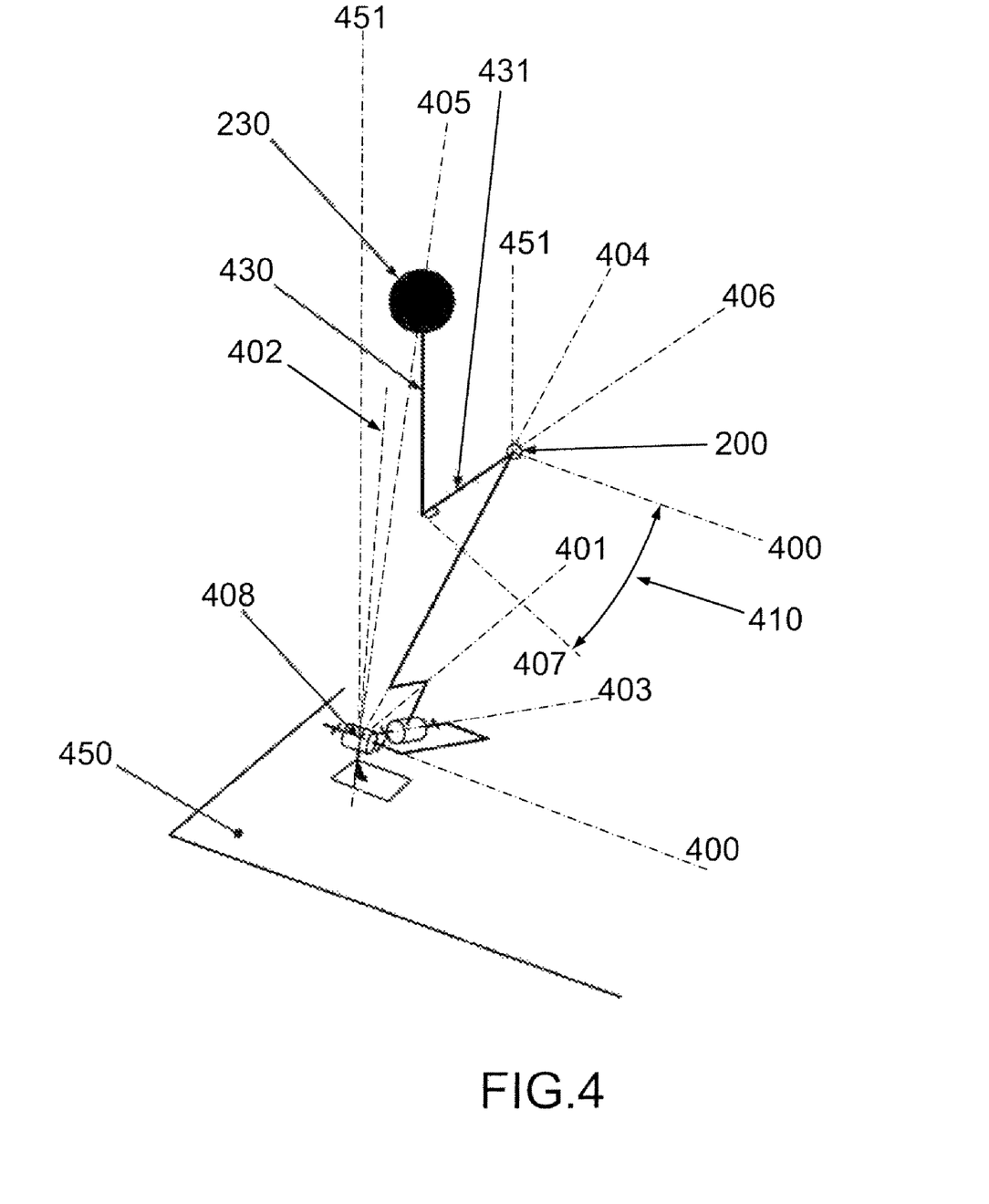
FIG. 4 is a schematic view of a robot showing the main points, axes and angles used to control its walking in one embodiment of the invention.

FIG. 4 is a schematic view of a robot showing the main points, axes and angles used to control its walking in one embodiment of the invention.

The references in the figure designate the following elements:
- 400: direction of the foot, which is also the direction of the roll pivot of the ankle;
- 402: direction perpendicular to the surface of the sole, directed upward (which is not necessarily vertical);
- 401: perpendicular to 400 and 402, such that the system of axes (400, 401, 402) constitutes a direct orthonormal coordinate system;
- 403: direction of the pitch pivot of the ankle;
- 404: direction of the leg, given by the straight line passing through the center of the hip 200 and the point 408;
- 405: straight line passing through 408 and the COM, and, by extension, direction of this straight line;
- 406: straight line passing through the centers of the right and left hips (axis of the pelvis), and, by extension, direction of this straight line;
- 407: direction orthogonal to 406, directed forward;
- 408: center of the ball joint of the ankle situated at the intersection of the straight lines 400, 401 and 402;
- 430: straight line symbolizing the direction of the thorax;
- 450: ground (which is not necessarily horizontal);
- 451: vertical.

In the rest position, the directions 402 and 404 (respectively 401 and 403) are one and the same.

The leg-hip-thorax system is modeled as represented in the figure: the leg 404 is connected to the hip 200; the hip 200 is connected by a half pelvis to the axis of the thorax 430 to which the pelvis is perpendicular. The center of mass COM, 230, is situated on the axis 430. The masses of the intermediate solids are considered to be negligible. The robot is likened to a one-off mass situated at the center of mass COM, 230.

In the following descriptions, the movements of the different points of the robot are identified in the coordinate system connected to the foot of the robot bearing on the ground. In this coordinate system centered on the ankle 408, the axes 400, 401, 402 respectively define the direction of the axis of the foot, the axis parallel to the sole and perpendicular to 400, passing through the ankle 408 and the upward perpendicular to the plane formed by the two straight lines 400, 401. During the walk, these references (408, 400, 401, 402) constitute a succession of Galilean coordinate systems. A determination is made as to the speed of the center of mass, which is the center of a non-Galilean coordinate system (coordinate system $R_O$), in this Galilean coordinate system which is fixed at the start of each of the ballistic phases. This makes it possible to compute the next position of the foot on each step independently of the earlier and later positions, therefore without having to determine a trajectory, unlike what is necessarily in the ZMP computations. There is therefore no point in resolving the equations of the Fundamental Principles of Dynamics. For this, it is only necessary to have, for example, an inertial unit or, more generally, combinations of rate gyros and accelerometers. These sensors may be positioned, for example, in the thorax or in the head, this necessarily having to remain as stable as possible, however. The need to know the ground in order to deduce the vertical therefrom is thus dispensed with. A direction 404 is also defined, which is collinear to the leg, as is a direction 405 which passes through the ankle 408 and the center of mass COM.

In one of the embodiments of the invention, the direction of the thoracic axis 430 is servo-controlled to a substantially constant angle relative to the vertical, known, for example, to the inertial unit, this being done so as to stabilize said inertial unit as much as possible. The movements of the axis of the hips 406 are also controlled by the angle 410 that said axis forms with the axis 400 of the coordinate system of the foot. Purely by way of illustration, it is possible, for example, to set the setpoint applied to this angle 410 so that it is equal, at the moment of the placement of the future bearing foot, to half the angle formed by the latter with the actual foot.

Figure 5:
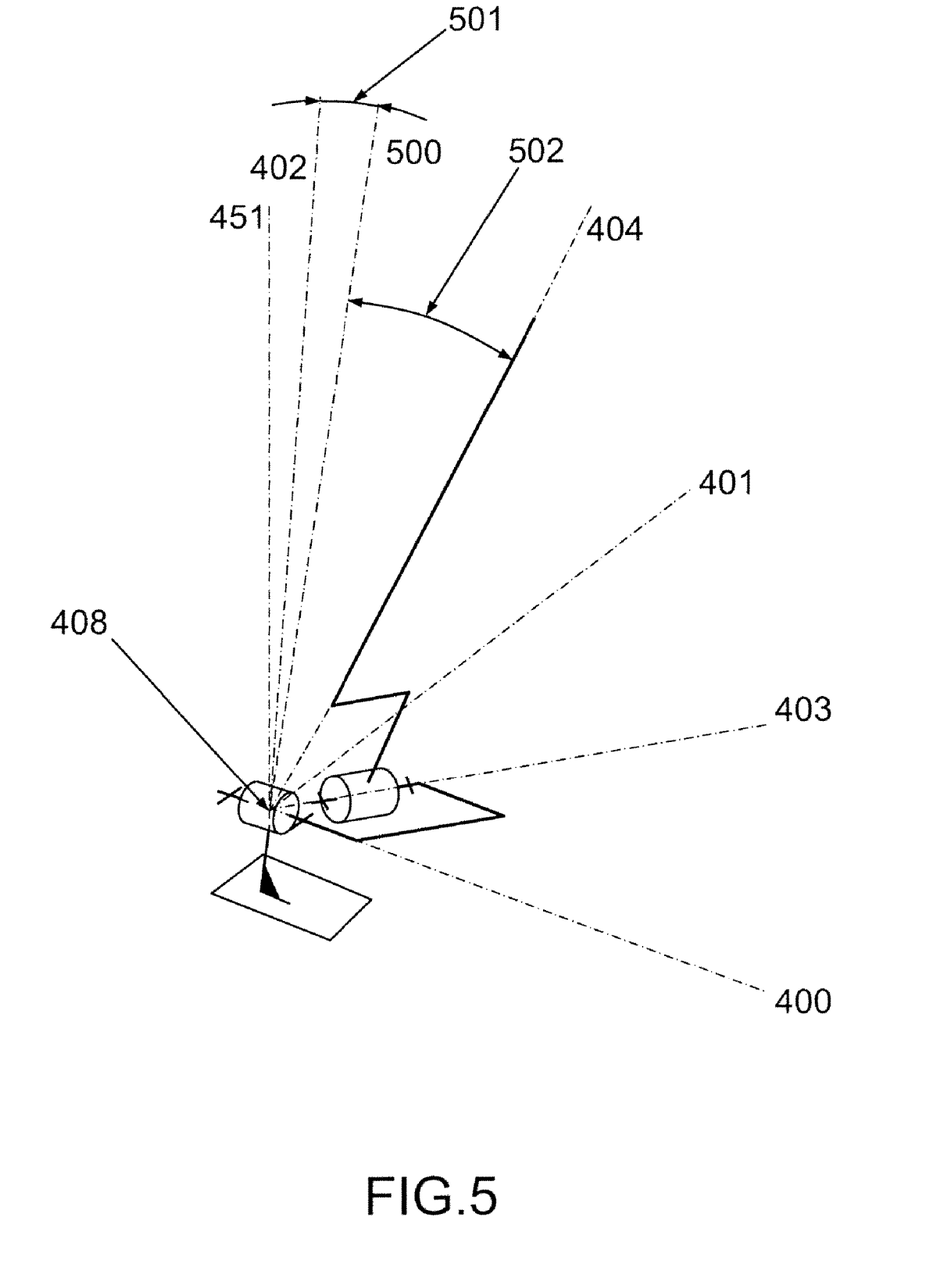
FIG. 5 is a detailed view of the part of FIG. 4 centered on the foot.

FIG. 5 is a detailed view of the part of FIG. 4 centered on the foot. This figure contains the following additional references:

500: direction such that (400, 403, 500) is a direct orthonormal coordinate system. It is therefore the result of the rotation of angle 501 around 400, applied to 402.

501: angle of rotation around 400; this is the roll angle of the ankle; the position at rest is defined such that the direction 403 is identical to the direction 401 and 500 is identical to 402;

502: angle of rotation around 403; this is the ankle pitch angle; the position at rest is defined such that the direction 404 is identical to the direction 500.

In one embodiment, the robot has three articulations in the foot:

an articulation (situated at the point 408) making it possible to control the movements of the foot pitch-wise (pitch angle 502 in the plane of the walk);

an articulation making it possible to control the movements of the foot roll-wise (roll angle 501 in the plane of the hips at rest);

a pivot making it possible to control the movements of the front of the foot, also called toes, pitch-wise (pitch angle in the plane of the walk) relative to the ground.

The two articulations situated at the point 408 (articulations of the ankle) are motorized, the articulation of the front of the foot may be passive or motorized. Similarly, the hip will preferentially include a ball joint motor-driven, for example, by three pivots or a parallel kinematic system. The motor drive for this hip has to make it possible to servo-control the axis of the thorax 430 to an angle that is substantially constant relative to the vertical, and the movement of the hips 406. The power of these motors will be engineered according to the desired reactivity of the walk. Advantageously, they may be controlled by a computer system such as the one disclosed by the application FR08/01956000 filed by the applicant of this application relating to three-level control/command architecture for a mobile robot using articulated limbs. A first processor generates high-level commands which are passed to a second processor which manages the communications with the motor control boards.

In one embodiment of the invention, to find the walking solution, the system is resolved in two phases:

in a first phase, the heel is on the ground; the system considered consists of the mass of the robot applied to the center of mass COM, by the segments without mass consisting of the leg and the axis of the thorax connecting the center of mass to the axis of the hips; the external force applied to the system is resultant of the weight (gravity applied to the mass of the robot at COM) and of the force resulting from the flat bearing of the foot on the ground (opposing force directed substantially according to 405);

in a second phase, the system is made up of the preceding system, with the foot added; the control parameter is the angle 502; this control parameter is, for example, given by an angular speed ramp of the motor of the pitch articulation of the ankle which may, for example, be dependent on the limiting angular acceleration of the motor and on the ratio of the speed of the center of mass to the walking speed setpoint. Advantageously, this setpoint is given as torque. In practice, the aim is to transmit the energy to the system, and therefore a force along a movement. With a torque control, the energy that is imparted to the system is more finely controlled. Furthermore, since force has to be applied to the ankle to make the heel lift, independently the position of said ankle, a position-wise control is complicated, because the position and the speed of the ankle must first be measured, and then a ramp has to be established from this operating point. These computations are more complicated and therefore mobilize more computation power than the application of a torque-wise control measured in Nm.

For the two phases, it would be possible to resolve the equations of the movement which are obtained by writing the Fundamental Principles of Dynamics (FPD) applied to the system. However, these computations are not necessary: the ballistic phases do not have to be computed because they do not require the application of particular commands. For the impulse control phases, which are independent of one another, no trajectory computation is necessary, only the parameters of strength and of the moment of triggering of the impulse are to be computed. Finally, the position of the foot on the next step must also be computed according to the speed of the COM taken at selected moments of the ballistic phase.

The different computations that make it possible to determine these elements are given later in the description, as commentary to FIG. 10.

Figure 6:
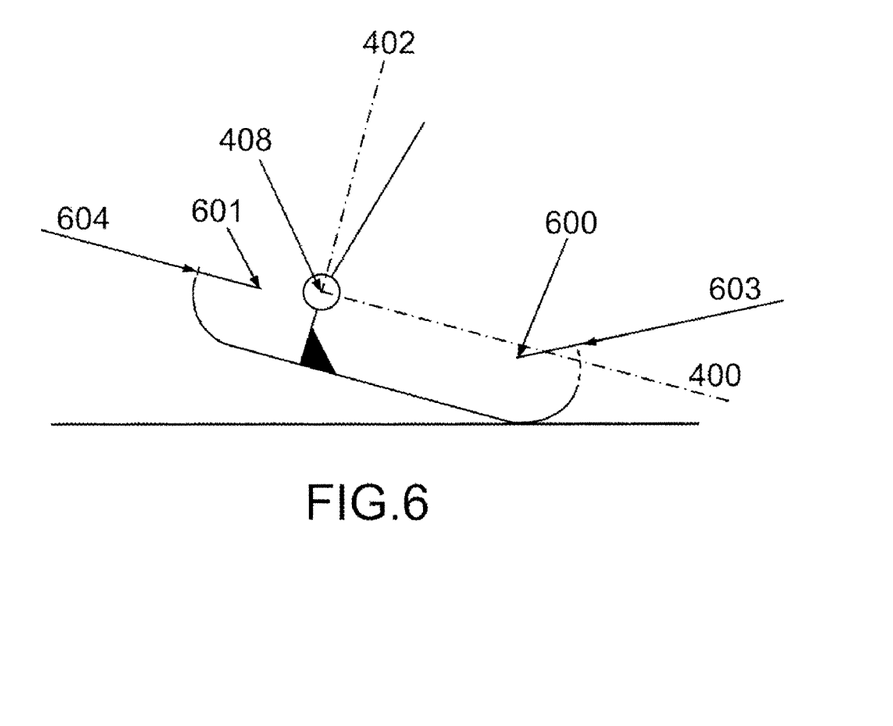
FIG. 6 is a schematic view showing a first embodiment of a foot of a robot for implementing the method of the invention by allowing the heel to lift during the impulse phase during walking.

FIG. 6 is a schematic view showing a first embodiment of a foot of a robot for implementing the method of the invention by allowing for the lifting of the heel in the impulse phase during the walk.

Figure 7:
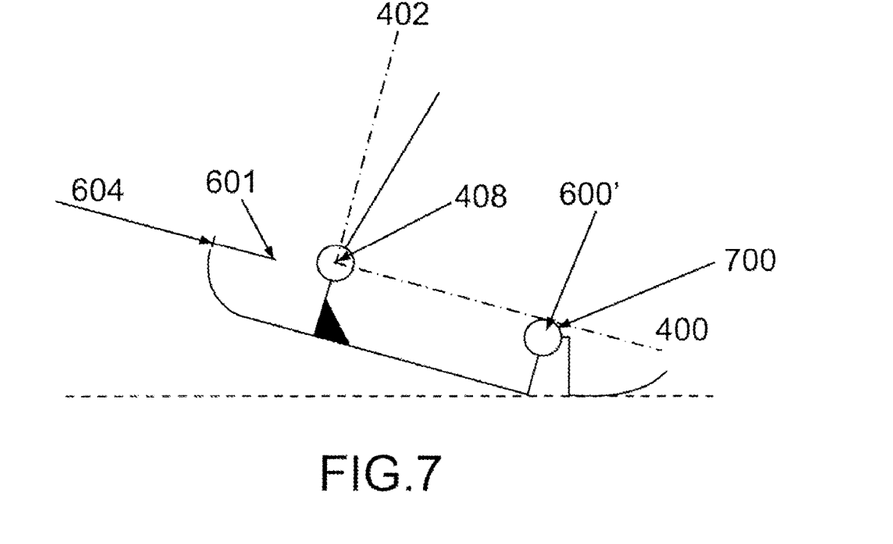
FIG. 7 is a schematic view showing a second embodiment of a foot of a robot for implementing the method of the invention with a pivot articulation situated at the front of the foot.

FIG. 7 is a schematic view showing a second embodiment of a foot of a robot for implementing the method of the invention with a pivot articulation situated at the front of the foot.

The two figures represent variant embodiments.

These figures contain the following additional references:

600: axis of the front cylinder 603;
600': axis of the pivot 700;
601: axis of the rear cylinder 604;
603: front cylinder allowing for the lifting of the heel;
604: rear cylinder allowing for the lifting of the point of the foot;
700: pivot between foot and toes.

The foot of the robot must be configured to be able to perform pitch movements around its front part and around its rear part. To this end, each foot of the robot is advantageously configured with a front cylinder 603 of axis 600 (or a pivoting toe 700 of axis 600') and a rear cylinder 604 of axis 601, the axes 600 (or 600'), 601 being parallel to the sole, and perpendicular to the direction of the foot 400.

Pitch movements with one or other of the exemplary feet (FIG. 6 and FIG. 7) are the result of the dynamics of the system subjected to the driven action of the pitch articulation motor of the ankle as described previously. The speed of the center of mass creates a kinetic energy which facilitates the elongation of the bearing limb, even in the absence of pivot at the toes, when the front end of the foot is rounded ("punch bag" effect). The action of the pivot, provided in the variant embodiment of FIG. 7, thus, however, allows for a better control of the triggering of the impulse and a better stability of the bearing points and therefore a better adjustment of the walking speed to a setpoint.

Figure 8:
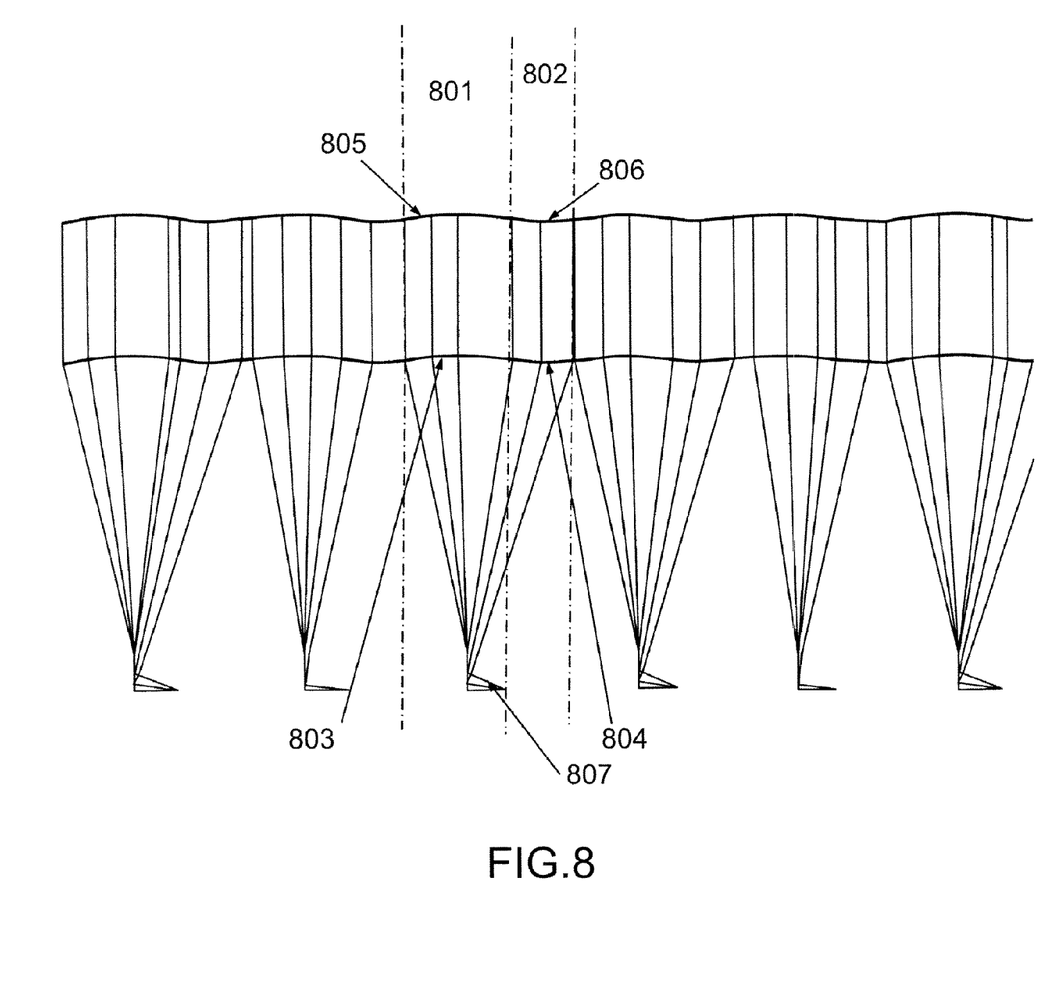
FIG. 8 shows a side view of the trajectories of a leg, of the hip and of the center of mass of a robot according to one embodiment of the invention.

FIG. 8 shows, a side view of the, trajectories of a leg, of the hip and of the center of mass of a robot according to one embodiment of the invention.

References in the figure designate the following elements:
- 801: a ballistic phase;
- 802: an impulse phase;
- 803: the trajectory of the hip of the support leg during the ballistic phase 801;
- 804: the trajectory of the hip of the support leg during the impulse phase 802;
- 805: trajectory of the COM during the ballistic phase 801;
- 806: the trajectory of the COM during the impulse phase 802;
- 807: the foot during the impulse phase (of lifting of the heel).

Walk of a robot, for which only the bearing leg is seen on each step, is schematically represented in the figure:
- the center of mass COM locally describes a trajectory over an arc of sphere offset relative to the sphere described by the hip;
- the hip describes an arc which is inscribed on a sphere whose center is the center of the ankle (previously referenced 408 in FIG. 4);
- the leg oscillates like an inverse pendulum during the bearing points on the ground and progresses step by step. Between each inverse pendulum there is the impulse phase of the ankle.

In this example, the average walking speed is approximately 1.45 m/s and the duration of a step is approximately 0.25 s.

Figure 9:
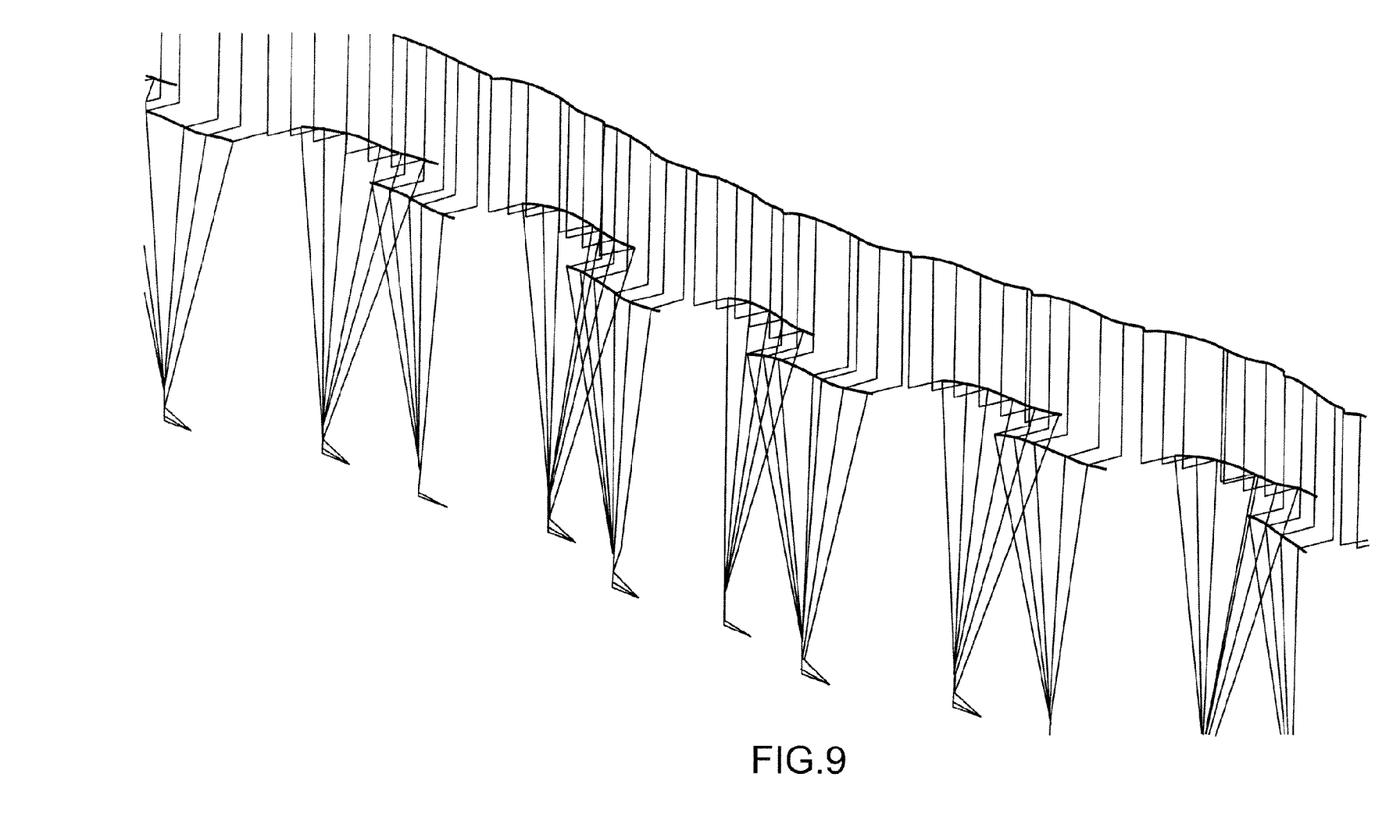
FIG. 9 is a front three-quarter view showing the trajectories of the two legs, of the two hips and of the center of mass of a robot according to one embodiment of the invention.

FIG. 9 shows, through a front three-quarter view, the trajectories of both legs, both hips and of the center of mass of a robot according to one embodiment of the invention.

This makes it easier to observe how the walk progresses. In particular, the center of mass follows a trajectory in the vertical plane which is smoothed by the impulses imparted by the heel between the arcs of sphere described during the displacement of a limb on the ground. The walk proceeds in the direction of the setpoint. The walk is thus "quasi-human", which is one of the objectives of the invention.

In the embodiment illustrated, the walk is functionally broken down into three phases:
- a "pseudo-free" phase: in this phase, the ankle does not drive the movement; it is a ballistic phase, during which the hip follows a ballistic trajectory, determined by the speed and the position of entry into this phase; the trajectory is controlled by motorizing the ankle to reduce the effects of the dry and viscous frictions in pitch and slow down the roll to a greater or lesser degree; by default, the articulation of the ankle may be declutched;
- an impulse phase: this is the phase during which energy is brought to the walk; during this phase, the ankle is controlled in pitch, for example, by a speed ramp;
- a next foot reactive positioning phase: this is a reactive walk; on each step, the walking algorithm determines the position of the next foot. This position is determined by taking into account the speed and the acceleration of the center of gravity (chosen at certain key positions), the direction "high level" setpoint and the "speed high level" setpoint.

Figure 10:
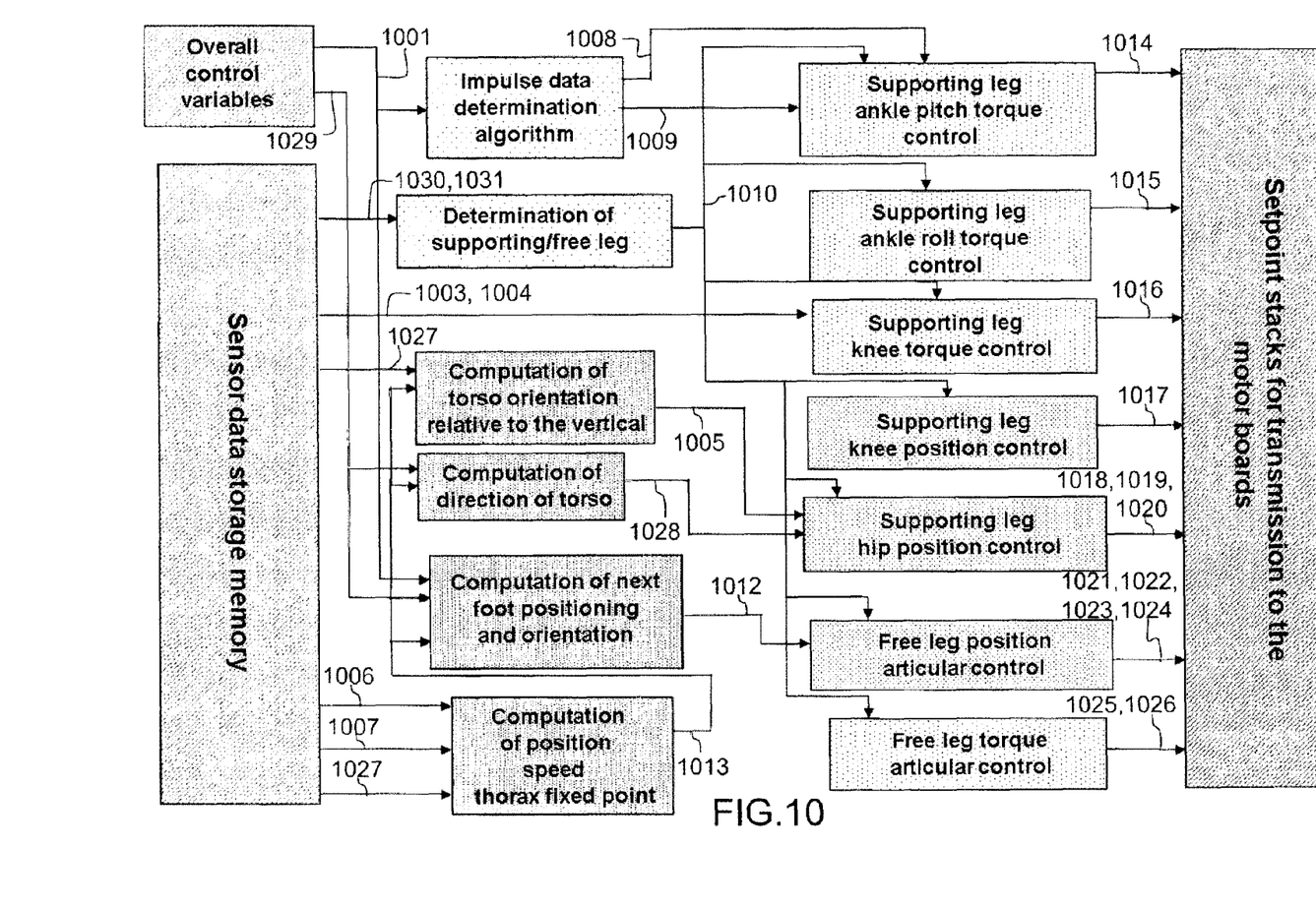
FIG. 10 is a flow diagram of computer processing operations for implementing the invention according to one of its embodiments.

FIG. 10 is a flow diagram of computer processing operations to implement the invention according to one of its embodiments.

The walking control algorithm is illustrated by the figure which indicates, in one embodiment of the invention, the overall control variables 1001, 1002 and the data obtained from the sensor data storage memory 1003, 1004, 1005, 1006, 1007 which are referred to the processing modules to generate the state variables and the setpoints to be transmitted to the motor boards, said setpoints being stored in stacks processed by the processors of the robot. The meaning of the variables is as follows:
- 1001: walking speed setpoint;
- 1003: knee articular position;
- 1004: knee articular angular speed;
- 1005: angles of orientation of the torso in the coordinate system Ro (it being understood that Ro is stabilized "horizontal");
- 1006: support leg articular positions;
- 1007: support leg articular speeds;
- 1008: impulse/no impulse state variable;
- 1009: impulse parameters (detailed in the explanation of the processing operations used to generate them);
- 1010: support/free leg state variable;
- 1012: next foot Cartesian position setpoint;
- 1013: thorax center position and speed;
- 1014: ankle pitch torque setpoint when the leg is in support mode;
- 1015: ankle roll torque setpoint when the leg is in support mode;
- 1016: knee pitch torque setpoint when the leg is in support mode;
- 1017: knee pitch position setpoint when the leg is in support mode;
- 1018: hip pitch position setpoint when the leg is in support mode;
- 1019: hip roll position setpoint when the leg is in support mode;
- 1020: hip yaw position setpoint when the leg is in support mode;
- 1021: hip position setpoint, same variable as 1018 when the leg is free;
- 1022: hip roll position setpoint, same variable as 1019 when the leg is free;
- 1023: hip yaw position setpoint, same variable as 1020 when the leg is free;
- 1024: knee pitch position setpoint, same variable as 1017 when the leg is free;
- 1025: ankle pitch torque setpoint, same variable as 1014 when the leg is free;
- 1026: ankle roll torque setpoint, same variable as 1015 when the leg is in the air;
- 1027: inertial unit data;
- 1028: torso direction setpoint;
- 1029: walking direction setpoint;
- 1030: data from pressure sensors under the feet or force sensors on the foot;

1031: leg motor current measurements.

The boxes in the central part of the figure each perform some of the processing operations of the following types:
- a first group of modules is used to determine state variables (such as the presence or absence of an impulse, 1008; or the state of the leg, in support mode or free, 1009); they are situated top left in the figure ("impulse determination algorithm" and "support/free leg determination", it being understood that the first module is also used to generate setpoint parameters;
- a second group of modules is used to perform the position computations for the top part of the robot (bottom left in the figure);
- a third group of modules is used to generate the torque controls for the articulations of the ankle and the knee (top right in the figure);
- a fourth group of modules is used to generate the position controls for the knee and the hip when the leg is in support position and the positional articular controls when the leg is free (bottom right part of the figure), it being understood that certain articulations are controlled position-wise and others torque-wise when the leg is free.

The computation algorithms implemented in the main modules are detailed below:

"Support/Free Leg Determination" Module:
the module returns two state variables referenced 1010: right_leg_state and left_leg_state Each variable can take 2 values: support and free.

The determination is made by comparing the values of the motor current measurements, and of the force sensors on the feet or pressure sensors under the soles.

"Impulse Determination Algorithm" Module:
the module takes as input the overall walking speed setpoint V_setpoint (m/s). It is possible, by way of nonlimiting example, to set a setpoint speed of between 0.5 and 1.5 m/s.

The impulse is determined from a certain number of characteristic angles (in radians), the numeric values being given to illustrate typical situations, without the invention being able to be considered to apply only to situations measured by these values:
- base_cone_angle, taken, for example, as 0.262 rd (15°), which corresponds to an average step;
- friction_cone_angle=arctan(0.3), which corresponds to the adherence of a normal surface;
- corrected_cone_angle=base_cone_angle*(1-max(0.3, 0.2*V_setpoint/norm(V_com))), formula in which V_com is the speed of the center of mass; this correction makes it possible to take account of the speed of the robot relative to the speed to be achieved; if the robot is not going very fast, it has to accelerate, and therefore have a greater impulse phase (which starts earlier) and therefore reduce the angle of the cone; the correction is the reverse if going too fast; in both cases, the correction is bounded;
- angle_1=angle between directions 402 and 405;
- angle_2=angle between directions 402 and 404.

The moment at which the impulse must start is determined by applying the following two rules:
IF (angle_1>friction_cone_angle)=>trigger impulse
IF (angle_2>corrected_cone_angle) and IF (V_Z_com <0)=>trigger impulse (in this formula, V_Z_com designates the speed of the center of mass on the vertical axis).

The impulse force is then determined. For example, it is possible to determine the parameters for servo-controlling the ankle for the impulse phase, with a "speed trapezium" type control.

Impulse_speed_coef=V_setpoint/norm(V_com)

Ankle_pitch_acc_setpoint=−max(abs(pitch_max_acceleration), 0.5*Impulse_speed_coef*pitch_max_acceleration)

Ankle_pitch_speed_setpoint=−max(abs(pitch_max_speed), 0.5*Impulse_speed_coef*pitch_max_speed)

The accelerations and speeds are negative because the ankle is unfolded (the foot is lowered).

"Next Foot Position Computation" Module:
For input, it receives
- the set of variables referenced 1013: position of the center of mass COM (X_com, Y_com, Z_com), and speed of the COM (V_X_com, V_Y_com, V_Z_com);
- the global walking direction control variable, direction_setpoint (a real number between −1 and 1).

One of the important elements that makes it possible to implement the invention is therefore the determination of the position and the speed of the COM. These elements are sufficient, in combination with the physical characteristics of the robot and the inclusion of the walking direction and speed setpoints, to determine a new position of the limb in motion that is compatible with the dynamic balance of the robot, without taking into account the history of the trajectory or its future progress. These are therefore instantaneous characteristics which do not entail complex trajectory computations. The dynamic balance of the robot is compatible with normally uneven progression surfaces, the nature of the manageable unevennesses largely depending on the accuracy of the COM position and speed measurements. Said accuracy can be ensured by means indicated below in the description.

The vectors and other coordinates are expressed in the coordinate system of the bearing foot: orthonormal coordinate system of center 408, of axes 400, 401 and 402.

At the output of this module, the variables referenced 1012: (X_next_foot, Y_next_foot, Z_next_foot) and the variable next_foot_direction: next_foot_dir, are recovered.

The following parameters are defined, with numeric values corresponding to exemplary operating conditions of the invention, without these conditions being able to be considered to be limiting:
l_foot: length of foot;
l_leg: length of leg;
Ky=−0.5
Kx=0.25
Kvx=0.0175*V_X_com
Kvy=3*V_Y_com/norm(V_com)
Y_offset is the signed half-width of the pelvis: Y_offset>0 when the bearing leg is the left leg, Y_offset<0 when the bearing leg is the right leg.
max_foot_angle=π/4

The computations for determining X_next_foot and Y_next_foot are then:

X_next_foot=X_com+l_foot+(Kx+Kvx)*l_leg

Y_next_foot=Y_com+min(Ky*Y_offset+(Kvy-direction_setpoint)*abs(Y_offset), −0.1*abs(Y_offset))
if on the left foot Y_next_foot=Y_com+max(Ky*Y_offset+(Kvy-direction_setpoint)*abs(Y_offset), 0.1*abs(Y_offset))
if on the right foot The aim of min/max, depending on the foot, is to avoid placing the foot on the other side of the center of the pelvis, relative to the hip.

The following also applies:

Z_next_foot=0.0;

next_foot_dir=arcsin(V_Y_com/norm(V_com))+
direction_setpoint*angle_max_foot

In fact, since the ground is not known, the contact occurs at a moment which is not precisely determined, therefore not at the X_next_foot and Y_next_foot determined by the computations, but in close proximity to this point (if the ground is in a non-planar, but reasonable, configuration).

"Torso Direction Computation" Module:

The computation of the direction of the torso is also the computation of the direction of the pelvis according to the walking direction.

The vectors and other coordinates are expressed in the coordinate system of the bearing foot: orthonormal coordinate system of center 408, of axes 400, 401 and 402.

The function takes as input the global walking direction control variables=direction_setpoint (1 real number between −1 and 1)

Let the angle dir_thorax=the angle numbered 410 in FIG. 4

It is possible, for example, to choose a pelvis orientation setpoint such that, at the end of a single support phase, thorax_dir_angle=next_foot_dir/2, which is tantamount to requiring, at the step output, the pelvis to be turned toward the next foot, by the half-angle between the feet, which corresponds to a "natural" progression.

To apply the setpoint, there are various possibilities, for example:

V_pelvis_rot_setpoint=direction_setpoint*V_pelvis_max_rot−
V_setpoint*coef*angle thorax_dir (measured at
the moment of the start of the step).

With, if V_pelvis_rot different from V_pelvis_rot_setpoint, then pelvis_rot_acc=pelvis_rot_max_acc.

The result can also be achieved by fixing a setpoint on the pelvis angle error:

pelvis_angle_error=next_foot_dir/2−angle thorax_dir

V_pelvis_rot_setpoint=Kp*pelvis_angle_error pelvis_vrot_error=V_pelvis_rot_setpoint−
V_pelvis_rot pelvis_rot_acc=Kv*pelvis_vrot_error It is also necessary to determine whether the application of a control has to be done in torque or in position. For example, as a general rule, the control of a knee position-wise is preferred to a torque-wise control only in the single support position (one leg supporting, the other free) so as to be able to keep the leg taut.

Thus, all the motor board control parameters necessary to the walk are determined.

The system for controlling the walking of a mobile robot of the invention can be implanted in a humanoid robot having two articulated lower limbs, each limb being provided with a certain number of degrees of freedom. Advantageously, the robot will be controlled by a three-level architecture, having two processors, one for generating the high-level commands, possibly transmitted by a communication link with a server, and the other being dedicated to the translation and to the transmission to the articulation motor control boards of the high-level commands. The first processor may be a PC-type central unit. The second processor may be a reduced instruction set (RISC) processor, for example of ARM™ brand. The clock rate of this second processor must be chosen so as to be compatible with the desired walking speed. In particular, for a walk resembling that of a human, a clock that makes it possible to generate instructions according to a periodicity of a few milliseconds will advantageously be chosen. The bus and the communication protocol must also be compatible with this walking speed objective. The walking speed of a humanoid robot in which the method of the invention is implemented will also depend on the height of its legs.

As already indicated, the robot must be provided with sensors making it possible to servo-control the direction of the thorax and the axis of the hips with the desired walking accuracy, which is itself determined by the more or less regular nature of the progression surface. This accuracy may be provided by a good quality inertial unit or a set of sensors whose measurements can be combined.

The feet of the robot will have to be instrumented so as to be able to allow the heel to be lifted stably. They may, for example, advantageously be as described by FIGS. 6 and 7, that is to say, allowing a rotation of the foot on its point without this being limiting on the invention. The quality of the control of the walk will also depend on the number of degrees of freedom of the other lower articulations (at least 2 in the angle, 2 in each hip plus one coupled in the pelvis (advantageously, a 3rd degree of freedom in each hip)) and, advantageously, on the possibility either of controlling them torque-wise or of declutching them during the free phases.

The examples described above are given simply to illustrate embodiments of the invention. They in no way limit the scope of the invention which is defined by the following claims.

The invention claimed is:

1. A method for controlling the walking of a robot configured to move on at least two limbs on a progression surface, said method comprising, for each step of the robot:
   moving a first hip over a substantially spherical trajectory centered on an end of a first limb, the end of the first limb bearing on the progression surface, the first limb attached to said first hip;
   moving said end of the first limb to a new bearing point on the progression surface;
   computing a position of the new bearing point of said end of the first limb on the progression surface based on a speed of a center of mass of the robot;
   augmenting an elongation between the end of the first limb bearing on the progression surface and said first hip obtained by an impulse of said end on the progression surface triggered by one of:
   a) a pitch-wise control of an ankle articulation provided in said first limb;
   b) control of an articulation of a knee; and
   c) control of a cylinder in the first limb, parallel thereto; and
   controlling the articulation of the knee, the articulation of the ankle, or the cylinder in the first limb to effect the impulse by a speed ramp as a function of a limiting acceleration of a motor and of a ratio of the speed of the center of mass to a walking speed setpoint.

2. The control method according to claim 1, further comprising:
   augmenting an elongation between the end of the first limb and said first hip by a value such that a segment joining a position of said first hip at the end of the spherical trajectory to a position of a second hip at a start of a next spherical trajectory is substantially parallel to the progression surface, the augmenting an elongation occurring between the moving the first hip and the moving the end of the first limb.

3. The control method according to claim 1, further comprising servo-controlling an axis of a thorax of the robot to remain within an angle that is substantially constant relative to vertical.

4. The control method according to claim 1, further comprising servo-controlling an axis of the first hip and a corresponding second hip according to a direction of walking.

5. The control method according to claim 1, further comprising:
triggering impulses of a heel when a direction of the first limb has an angle relative to vertical greater than a limiting angle dependent on the speed of the center of mass and a walking speed setpoint.

6. The control method according to claim 1, wherein a travel of a foot in a direction of walking depends on variables chosen from the group consisting of a position of the center of mass in the direction of walking, a length of the first limb, a length of a foot, and a speed of the center of mass in the direction of walking.

7. The control method according to claim 1, wherein a travel of a foot in a direction perpendicular to a direction of walking depends on variables chosen from the group consisting of a position of the center of mass in the direction of walking, a walking direction setpoint, a hip width, a speed in the direction perpendicular to the direction of walking, and a walking speed setpoint.

8. The control method according to claim 1, wherein at least one limb is controllable to produce a deceleration movement before its end touches the progression surface.

9. A robot capable of moving on a progression surface on a plurality of limbs, said robot comprising:
a plurality of hips, each of the plurality of limbs being attached to a corresponding one of the plurality of hips, the plurality of hips including a first hip, the plurality of limbs including a first limb attached to the first hip;
at least one module configured to generate, for each step of the robot, a movement of the first hip over a substantially spherical trajectory centered on an end of the first limb, the end of the first limb bearing on the progression surface;
a module configured to generate a movement of said end of the first limb toward a new bearing point on the progression surface;
a module configured to compute a position of the new bearing point of said end of the first limb on the progression surface based on a speed of a center of mass of the robot;
a module configured to augment elongation between the end of the first limb bearing on the progression surface and said first hip obtained by an impulse of said end on the progression surface triggered by one of:
 a) a pitch-wise control of an ankle articulation provided in said first limb;
 b) control of an articulation of a knee; and
 c) control of a cylinder in the first limb, parallel thereto; and
a module configured to control the articulation of the knee, the articulation of the ankle, or the cylinder in the first limb to effect the impulse by a speed ramp as a function of a limiting acceleration of a motor and of a ratio of the speed of the center of mass to a walking speed setpoint.

10. The robot according to claim 9, wherein the first limb includes a cylinder whose axis is parallel to an axis of said first limb.

11. The robot according to claim 9, wherein the end of the first limb includes a foot comprising at least two pivot-wise articulations with axes that are substantially mutually parallel, and substantially perpendicular to a direction of the foot, one of the at least two pivot-wise articulations close to a front end of the foot and the other of the at least two pivot-wise articulations close to a heel of the foot.

12. The robot according to claim 9, wherein the end of the first limb includes a foot whose front end includes a rounding, the form of which triggers a lifting of a heel of the foot when the front end of the foot pivots forward.

13. The robot according to claim 9, further comprising a set of inertial sensors used to keep an orientation of a coordinate system connected to a part of the robot substantially constant relative to a fixed external coordinate system.

14. The robot according to claim 9, further comprising a set of inertial sensors providing accurate measurement of accelerations and speeds, linear and angular, of a thorax or of a head of the robot, and configured to deduce therefrom a vector speed of the center of mass.

* * * * *